(12) United States Patent
Motoe et al.

(10) Patent No.: US 7,778,018 B2
(45) Date of Patent: Aug. 17, 2010

(54) SUPPORT DEVICE AND ELECTRONIC EQUIPMENT SYSTEM

(75) Inventors: Hironori Motoe, Ome (JP); Satoshi Yokote, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 12/246,876

(22) Filed: Oct. 7, 2008

(65) Prior Publication Data
US 2009/0168312 A1 Jul. 2, 2009

(30) Foreign Application Priority Data
Dec. 26, 2007 (JP) ............................. 2007-333968

(51) Int. Cl.
*G06F 1/16* (2006.01)
(52) U.S. Cl. .................... 361/679.21; 235/41; 348/376; 362/277
(58) Field of Classification Search ............ 361/679.27, 361/679.41, 679.3, 679.43, 679.21; 174/260, 174/250, 138 G, 50; 235/492, 441; 348/435, 348/294, 373, 376; 362/245, 92, 277, 625
See application file for complete search history.

(56) References Cited

U.S. PATENT DOCUMENTS

| 6,102,721 | A * | 8/2000 | Seto et al. .................... 439/160 |
| 2009/0207558 | A1 * | 8/2009 | Hsiung et al. ........... 361/679.01 |
| 2009/0223795 | A1 * | 9/2009 | Lee et al. ..................... 200/329 |
| 2010/0043216 | A1 * | 2/2010 | Tersigni ........................ 29/747 |

FOREIGN PATENT DOCUMENTS

| JP | 03-208109 | 9/1991 |
| JP | U 03-121675 | 12/1991 |
| JP | U 04-20278 | 2/1992 |
| JP | 06-060935 | 3/1994 |
| JP | 06-176816 | 6/1994 |
| JP | 10-133780 | 5/1998 |
| JP | 2000-089851 | 3/2000 |
| JP | 2000-294956 | 10/2000 |

(Continued)

OTHER PUBLICATIONS

Notification of Reasons for Rejection issued by JPO in the corresponding to the Japanese Patent Application No. 2007-333968 mailed on Feb. 10, 2009.

(Continued)

*Primary Examiner*—Hung V Duong
(74) *Attorney, Agent, or Firm*—Knobbe, Martens, Olson & Bear LLP

(57) ABSTRACT

According to one embodiment, a support device includes: an electronic equipment guide section that guides an electronic equipment to be attached; a connector connectable to the electronic equipment guided by the electronic equipment guide section; a board on which the connector is mounted; a horizontal support section that supports the board movably in an in-plane direction of a side of the board, the side of the board on which the connector is mounted; a horizontal movement regulation section that regulates a movement of the board in the in-plane direction, being provided in a peripheral area of the board distant from the connector; and a vertical support section that supports the board movably in a direction perpendicular to the in-plane direction.

5 Claims, 11 Drawing Sheets

FOREIGN PATENT DOCUMENTS

| | | |
|---|---|---|
| JP | 2004-22270 | 1/2004 |
| JP | 2004-135119 | 4/2004 |
| JP | 2005-85575 | 3/2005 |
| JP | 2005-129453 | 5/2005 |
| JP | 2006-174620 | 6/2006 |

OTHER PUBLICATIONS

Notification of Reasons for Rejection issued by JPO in the corresponding to the Japanese Patent Application No. 2007-333968 mailed on May 26, 2009.

* cited by examiner

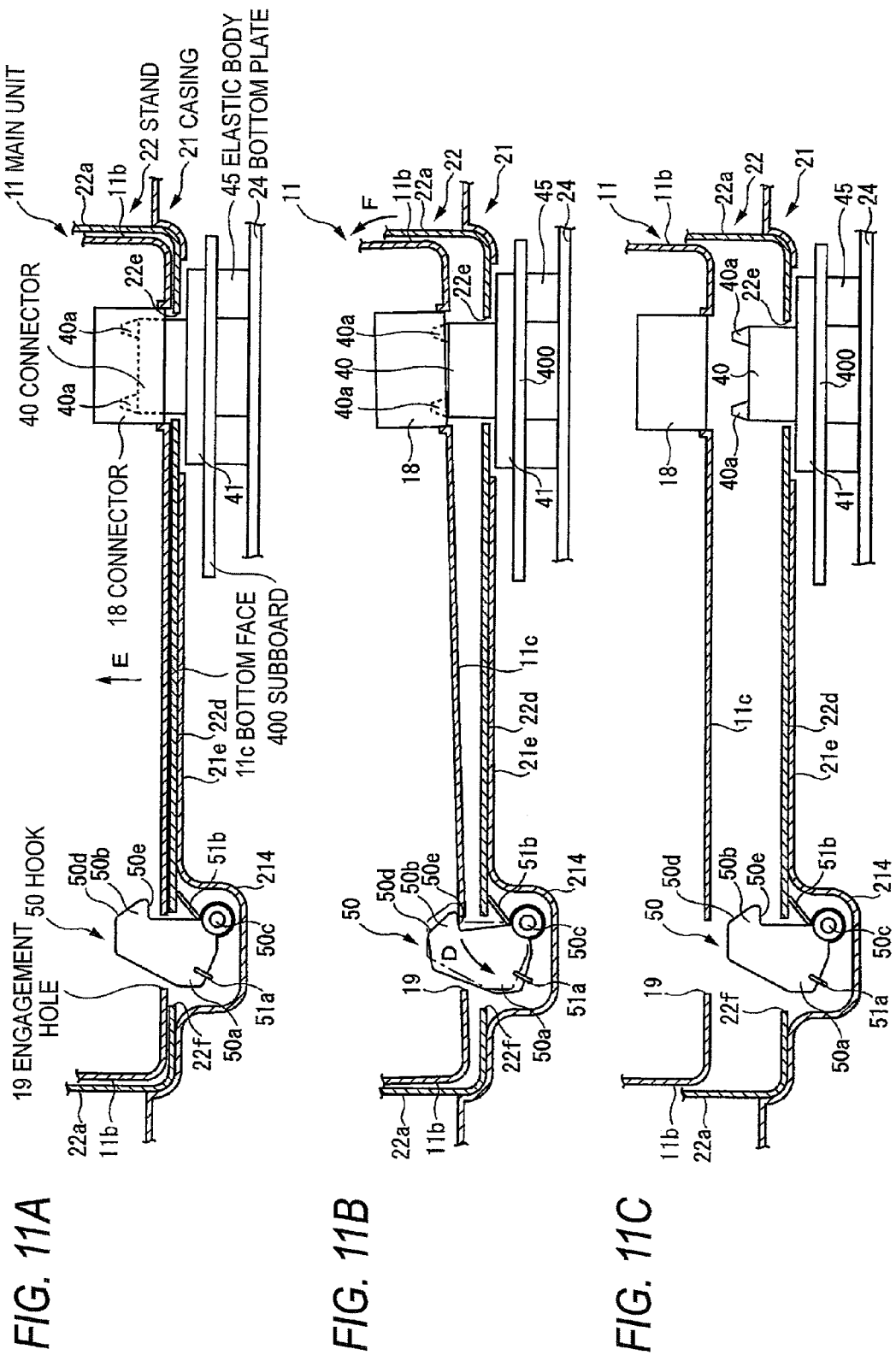

SUPPORT DEVICE AND ELECTRONIC EQUIPMENT SYSTEM

CROSS-REFERENCE TO RELATED APPLICATIONS

This application is based upon and claims the benefit of priority from Japanese Patent Application No. 2007-333968, filed on Dec. 26, 2007, the entire contents of which are incorporated herein by reference.

BACKGROUND

1. Field

This invention relates to a support device for supporting an electronic equipment and an electronic equipment system.

2. Description of the Related Art

In recent years, in a personal computer, a docking unit for detachably docking a personal computer main unit with a station main unit installing a disk drive, etc., separate from the personal computer main unit has been proposed (see JP-A-10-133780, for instance).

In the docking unit described in JP-A-10-133780, a docking connector is installed on a board in the station main unit and the board is supported by movable support unit of a ball bearing, etc., so that the board can be moved in the connector installation side (horizontal direction). If the docking connector and a personal computer connector provided in the personal computer main unit are in the range in which the mated connector can be guided into an appropriate joint position according to a guide part provided in a housing, etc., of either of the connectors, the board and the docking connector move relatively to the station main unit to join the personal computer connector and the docking connector if displacement between the connectors occurs.

However, the docking unit in the related art has the structure wherein the connector is moved only in a direction perpendicular to the connection direction of the connector and thus the connectors may receive an immoderate force and may be damaged.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 11A to 11C show an exemplary detaching operation of the portable computer from the cradle.

DETAILED DESCRIPTION

Various embodiments according to the invention will be described hereinafter with reference to the accompanying drawings. In general, according to one embodiment of the invention, an electronic equipment guide section that guides an electronic equipment to be attached; a connector connectable to the electronic equipment guided by the electronic equipment guide section; a board on which the connector is mounted; a horizontal support section that supports the board movably in an in-plane direction of a side of the board, the side of the board on which the connector is mounted; a horizontal movement regulation section that regulates a movement of the board in the in-plane direction, being provided in a peripheral area of the board distant from the connector; and a vertical support section that supports the board movably in a direction perpendicular to the in-plane direction.

Figure 1:
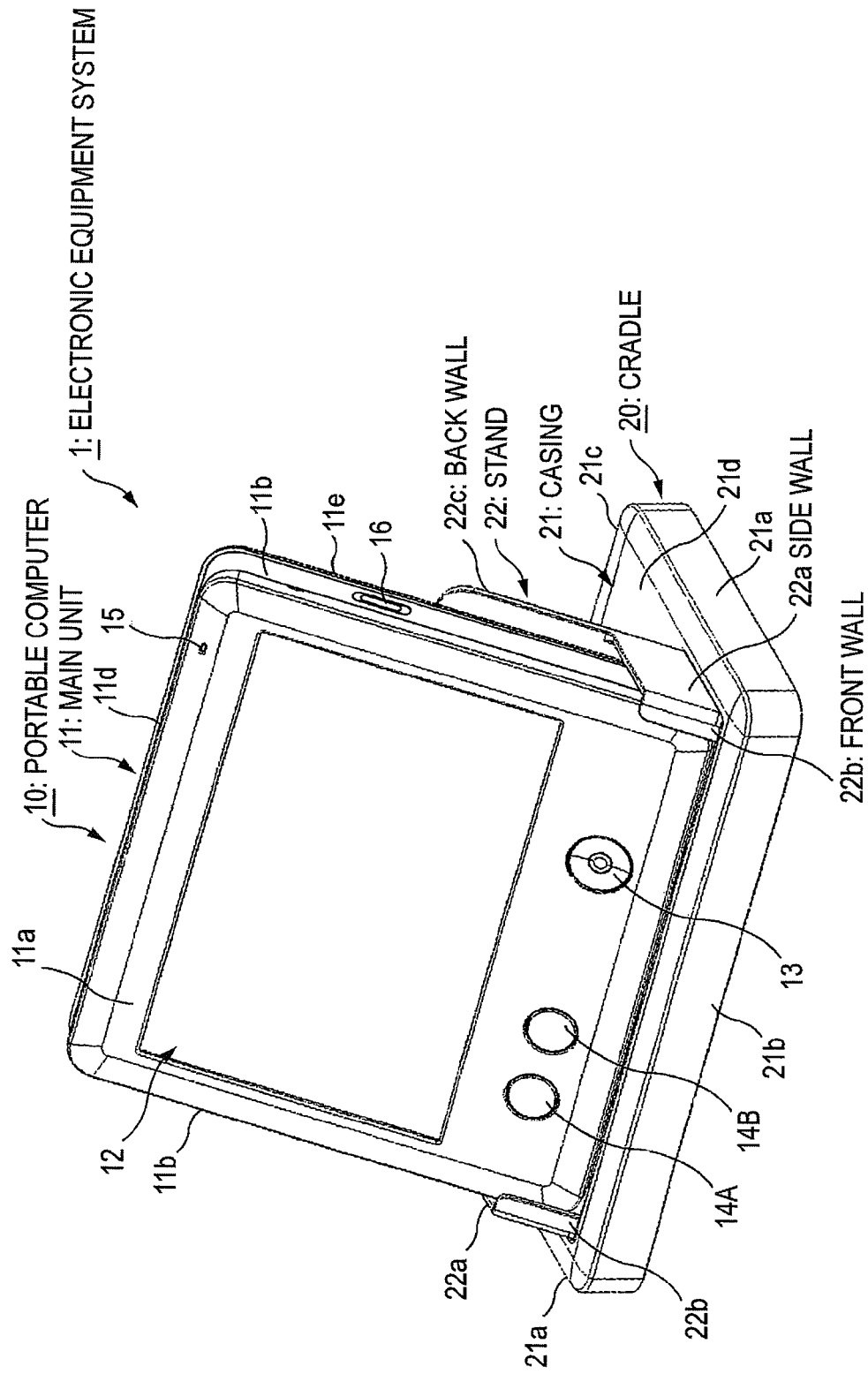
FIG. 1 is an exemplary perspective view of an electronic equipment system according to an embodiment of the invention.
Figure 2:
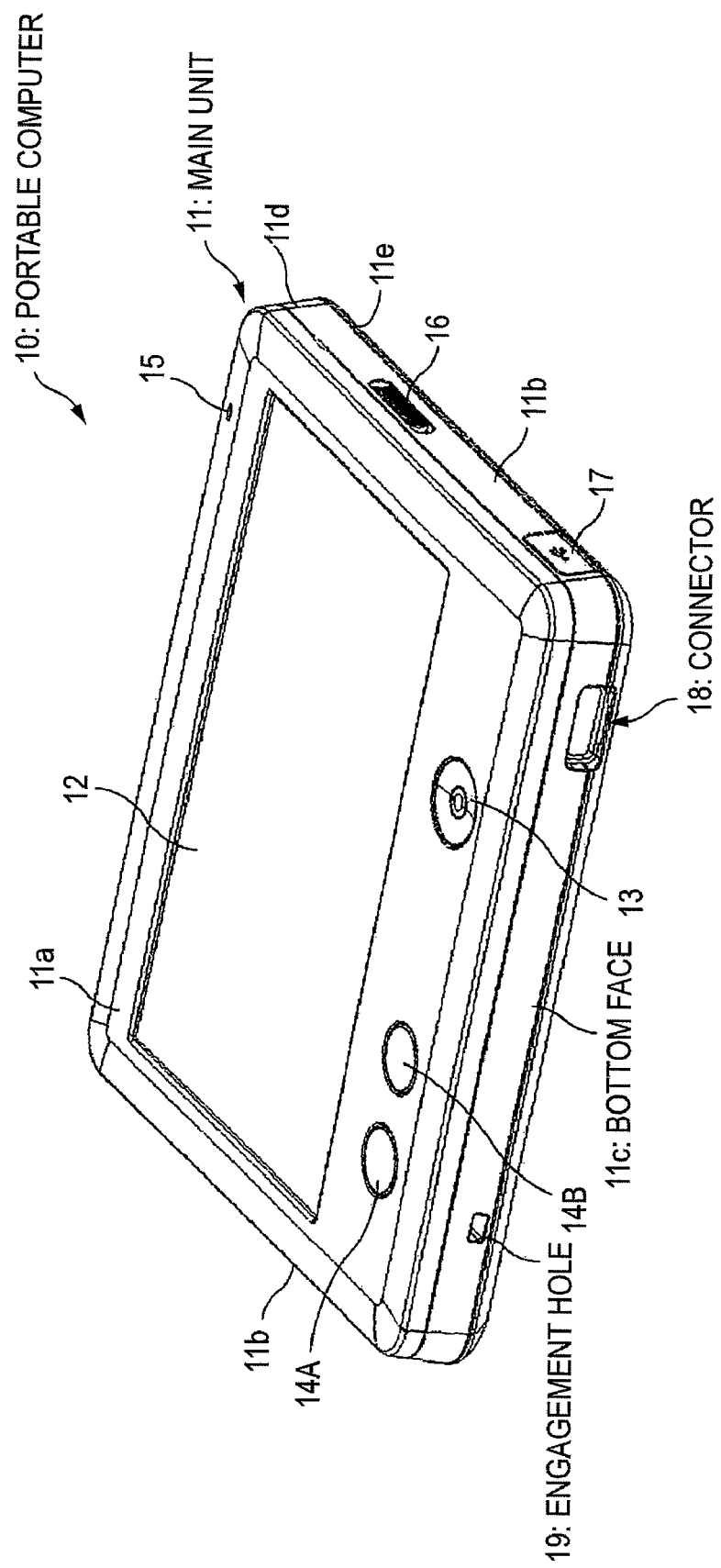
FIG. 2 is an exemplary perspective view of a portable computer configuring a part of the electronic equipment system.
Figure 3:
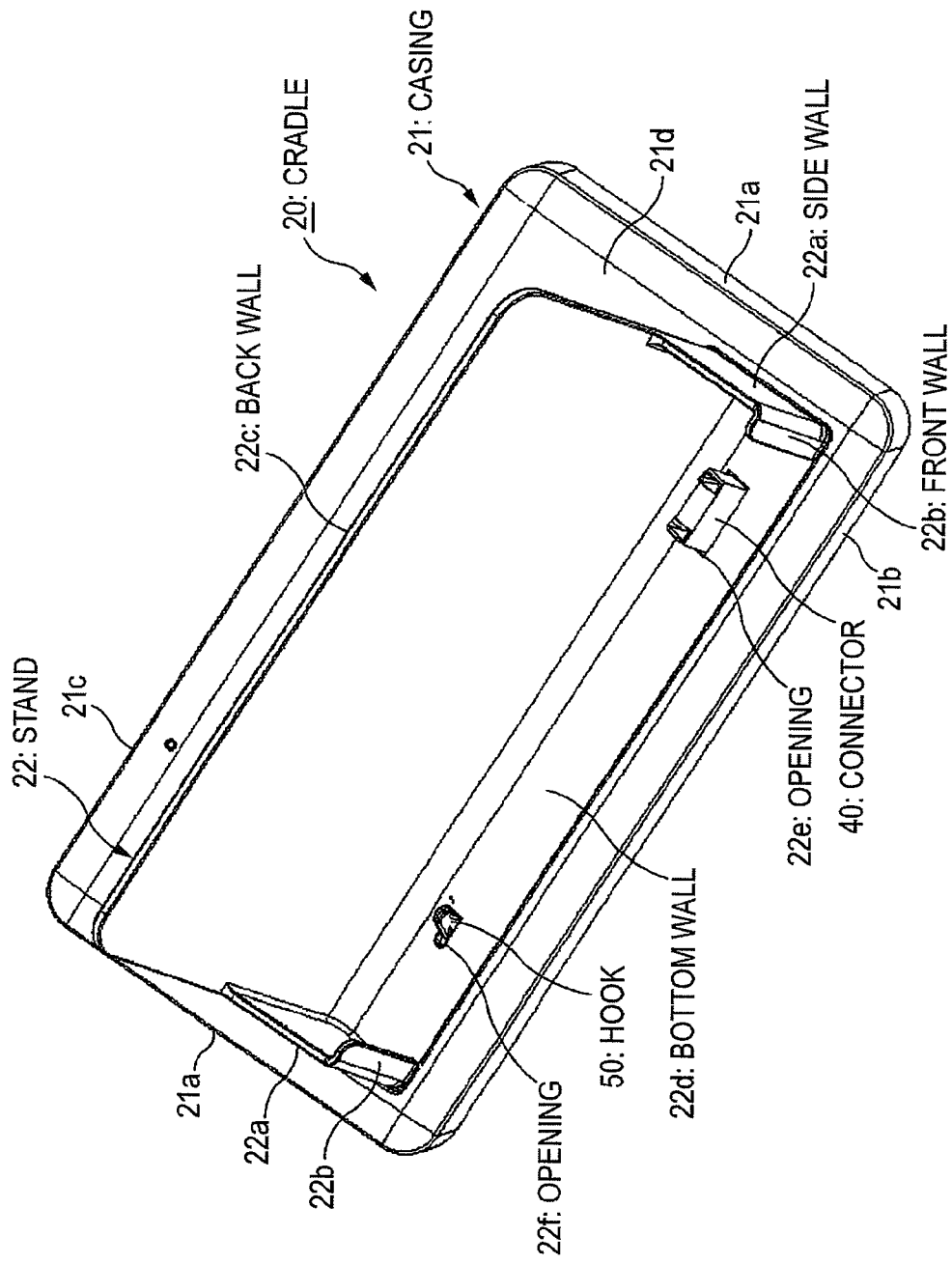
FIG. 3 is an exemplary perspective view of a cradle configuring a part of the electronic equipment system.

FIG. 1 is an exemplary perspective view of an electronic equipment system according to an embodiment of the invention, FIG. 2 is an exemplary perspective view of a portable computer configuring a part of the electronic equipment system, and FIG. 3 is an exemplary perspective view of a cradle configuring a part of the electronic equipment system.

(Electronic Equipment System)

An electronic equipment system 1 is configured of a cradle (support device) 20 placed mainly on a desktop, etc., for use and a tablet portable computer (electronic equipment) 10 that can be attached to and detached from the cradle 20, as shown in FIG. 1.

(Portable Computer)

The portable computer (hereinafter, also called simply "computer") 10 can be driven by a battery in a state in which it is removed from the cradle 20. The portable computer 10 includes a main unit 11 shaped roughly like a rectangle having a front 11a, side faces 11b, a bottom face 11c, a top face 11d, and a back 11e, as shown in FIGS. 1 and 2.

A display section 12 configured of a Liquid Crystal Display (LCD) and a tablet (described later) stacked on each other is placed almost in the center of the front 11a of the main unit 11, a cursor key 13, a left click switch 14A, and a right click switch 14B are placed below the display section 12, and a microphone 15 is placed above the display section 12.

A power switch 16 and a Universal Serial Bus (USB) terminal 17 are placed on the right side face 11b of the main unit 11, and a connector 18 and an engagement hole 19 are placed on the bottom face 11c of the main unit 11. A magnetic substance (not shown) that detects detachment of the computer 10 from the cradle 20 magnetically is placed inside the bottom face 11c.

The connector 18 is connected to a connector 40 shown in FIG. 3 provided on the cradle 20, and is provided at a position shifted in the right direction from the center of the bottom face 11c in FIG. 2 so as not to project from the bottom face 11c.

A hook 50 shown in FIG. 3 provided on the cradle 20 is retained in the engagement hole 19 and the engagement hole 19 and is provided at a position shifted in the left direction from the center of the bottom face 11c in FIG. 2.

(Cradle)

The cradle 20 has a function of supplying power to the computer 10 and a function of providing the computer 10 with expandability by communicating with an external apparatus such as external storage. The cradle 20 is not limited to these functions; for example, it may be an electronic equipment such as a personal computer or external storage. The cradle 20 includes a casing 21 incorporating various boards and a stand (electronic equipment guide section) 22 fixed to the casing 21 for supporting the computer 10, as shown in FIGS. 1 and 3.

The casing 21 has side walls 21a, a front wall 21b, a back wall 21c, a top wall 21d, and a bottom wall (described later). The connector 40 is attached to the bottom wall.

The stand 22 has side walls 22a, front walls 22b, and a back wall 22c as a guide when the computer 10 is attached to the cradle 20, and a bottom wall 22d against which the bottom face 11c of the computer 10 abuts. The stand 22 is fixed to the casing 21 by a screw, but may be configured integrally with the casing 21. The casing 21 may be provided with a depression for guiding the computer 10 without providing the stand 22.

The side walls 22a and the front walls 22b are set to a height lower than the back wall 22c; the height is a height capable of regulating the position of the lower outer peripheral part of the computer 10 before the connector 18 provided on the computer 10 comes in contact with the connector 40 provided on the cradle 20.

The bottom wall 22d is provided with an opening 22e for inserting the connector 40 shown in FIG. 3 and an opening 22f for inserting the hook 50 shown in FIG. 3.

Figure 4:
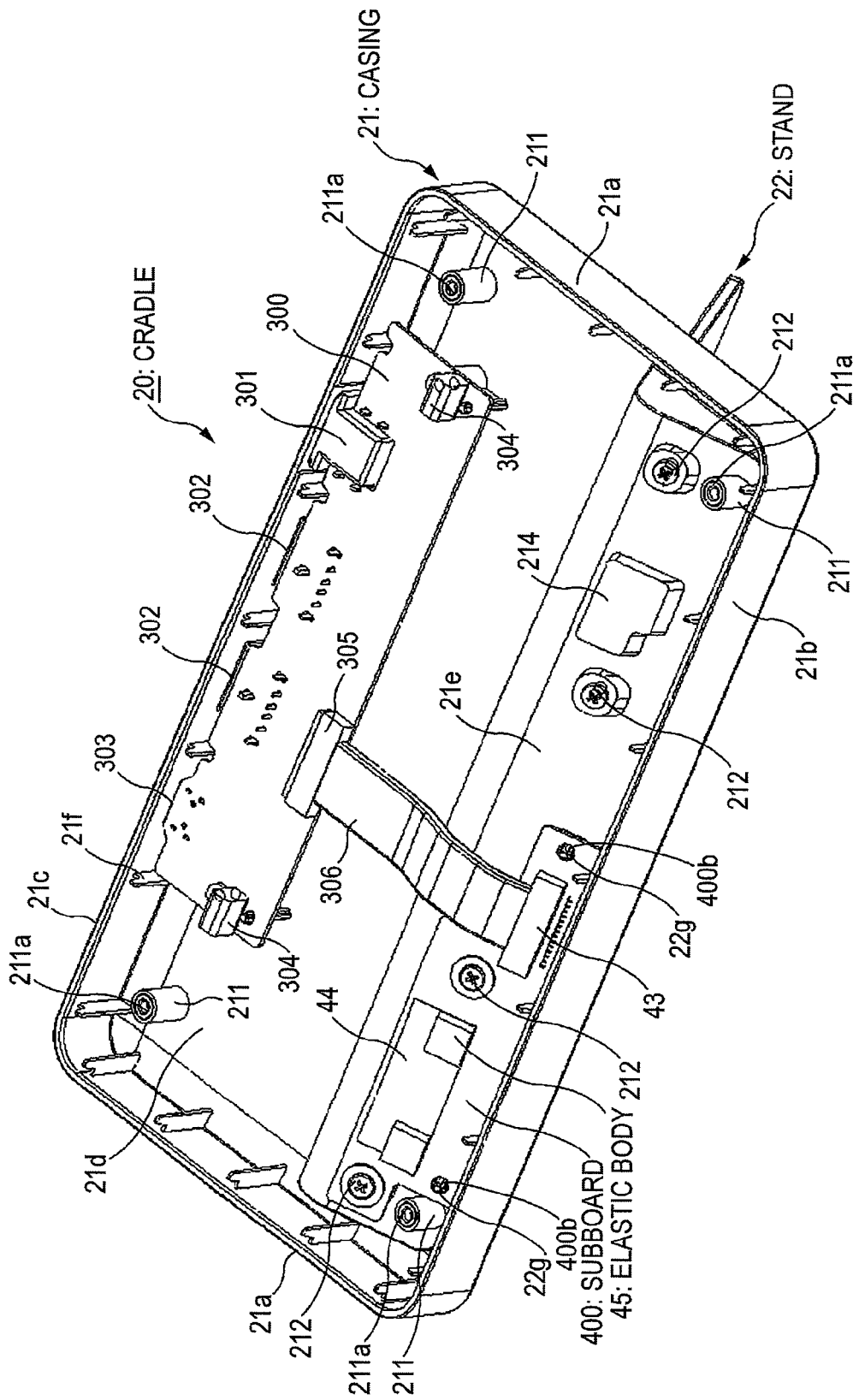
FIG. 4 is an exemplary perspective view of a cradle viewed from the bottom side thereof.
Figure 5:
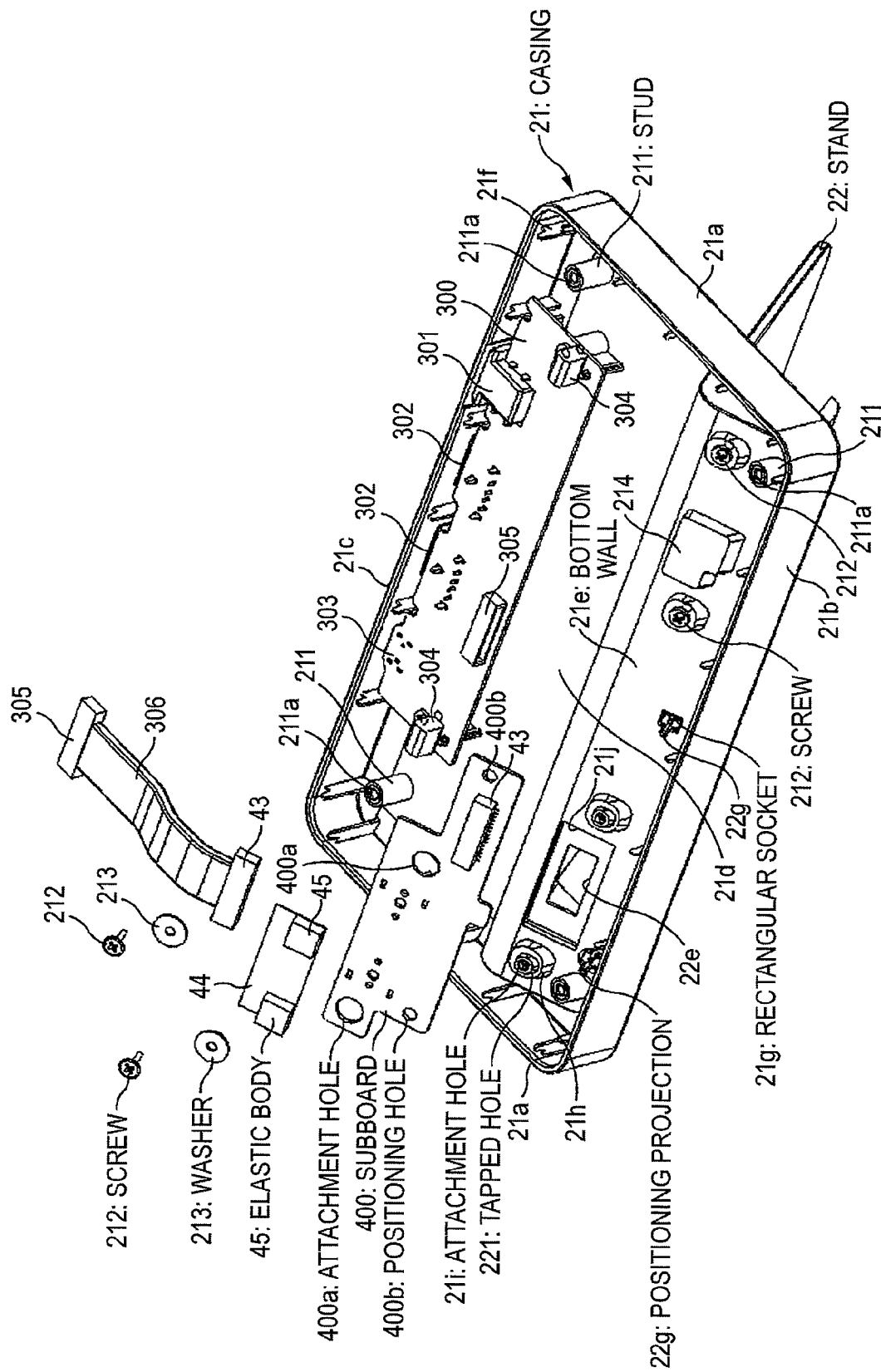
FIG. 5 is an exemplary exploded perspective view of the cradle viewed from the bottom side thereof.

FIG. 4 is an exemplary perspective view of the cradle 20 viewed from the bottom side thereof and FIG. 5 is an exemplary exploded perspective view of the cradle 20 viewed from the bottom side thereof. A bottom plate for closing the bottom face of the casing 21 is removed in FIGS. 4 and 5. To reinforce the side walls 21a, the front wall 21b, and the back wall 21c, the casing 21 is provided with a reinforcing piece from the top wall 21d. Studs 211 each provided with a tapped hole 211a are projected on the top wall 21d and the bottom plate is fixed to the tapped holes 211a by screws.

A main board 300 is attached to the top wall 21d of the casing 21, and a subboard 400 is attached to a bottom wall 21e.

The bottom wall 21e is provided with a hook housing part 214 for housing the hook 50 having a shape bent like a saddle, a rectangular socket 21g into which a positioning projection 22g provided on the stand 22 fits, boss parts 21h, attachment holes 21i formed in the boss parts 21h for attaching the subboard 400 and the stand 22, an opening 21j for escaping a pedestal described later, and studs 211 for fixing the bottom plate.

A power supply terminal part 301, USB terminals 302, and a mini USB terminal 303 are mounted on the main board 300 so that they are exposed to the back wall 21c of the casing 21, and a spacer 304 for securing a space from the bottom plate (not shown) and a connector 305 connecting to the subboard 400 are attached to the main board 300.

A film 44, elastic bodies (vertical support parts, elastic force giving members) 45 of a sponge, rubber, etc., provided on the film 44 for elastically pressing a bottom body (not shown), and a connector 43 for connecting the main board 300 are provided with the back of the subboard 400. The connector 43 on the subboard 400 is connected to the connector 305 on the main board 300 by a flexible wiring board 306.

Figure 6:
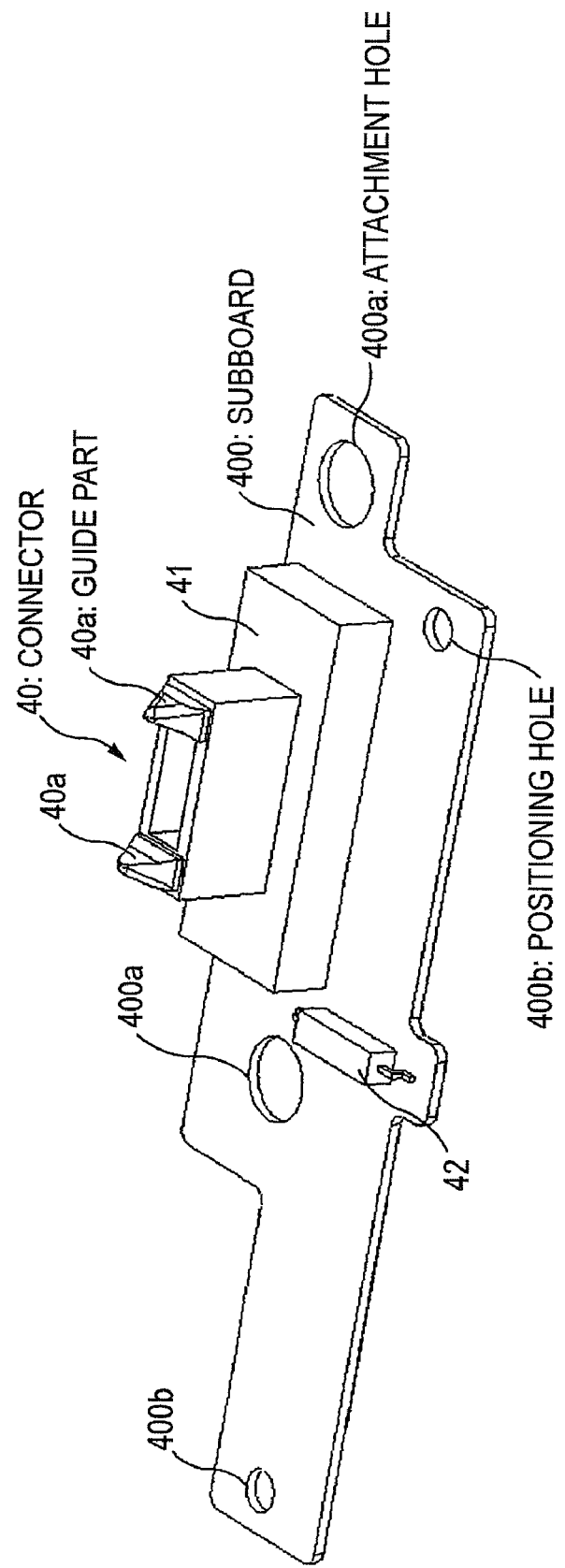
FIG. 6 is an exemplary perspective view of a subboard.

FIG. 6 is an exemplary perspective view of the subboard 400. The connector 40, a pedestal 41 to which the connector 40 is attached, and a magnetic sensor 42 are mounted on the subboard 400, and attachment holes 400a and positioning holes 400b are formed in the subboard 400. The connector 40 is provided with a pair of pyramid-shaped guide parts 40a for guiding the connector 40 into the connection position of the mated connector 18. If a shift length of the connection position between the connector 40 and the mated connector 18 is within the range in which the connector can be guided according to the guide parts 40a, the subboard 400 can make a horizontal move for allowing the connector 40 to be connected to the mated connector 18. The guide parts may be provided on both the connectors 18 and 40 or may be provided only on the mated connector 18.

The magnetic sensor 42 magnetically detects detachment from of the computer 10 from the cradle 20 in response to the distance from the magnetic substance provided in the computer 10. The magnetic sensor 42 may be provided in the computer 10 and the magnetic substance may be provided in the cradle 20.

(Attachment Structure of Subboard)

Figure 7A:
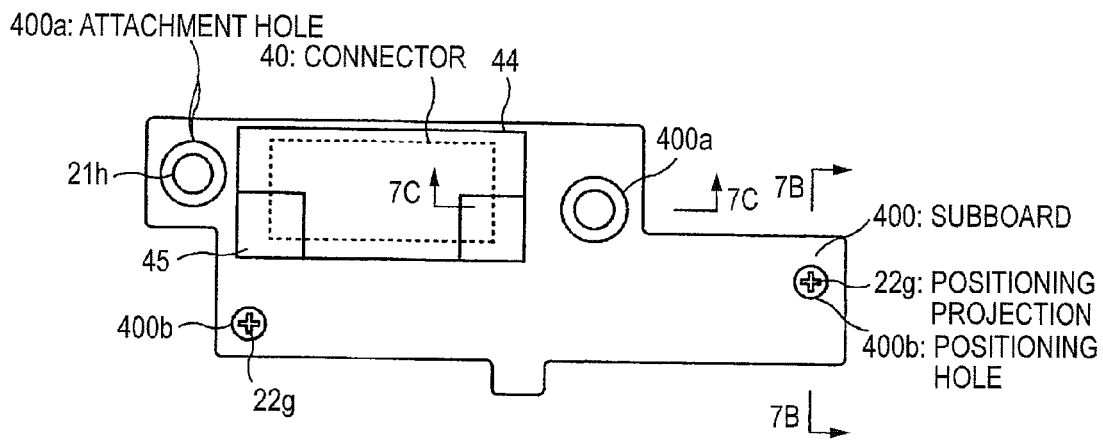
FIG. 7A is an exemplary plan view of the subboard.
Figure 7B:
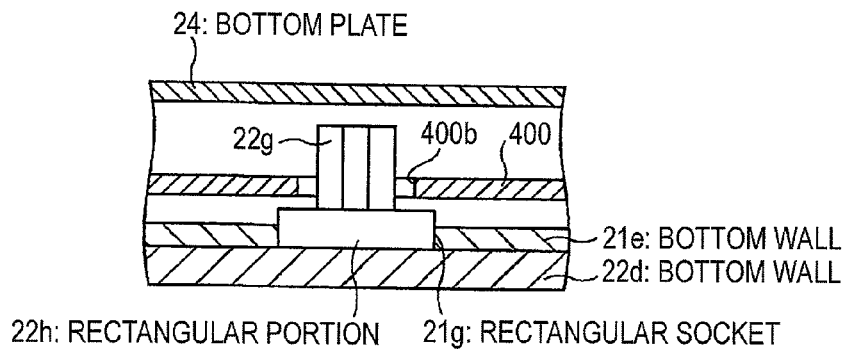
FIG. 7B is an exemplary sectional view taken on line 7B-7B in 7A.
Figure 7C:
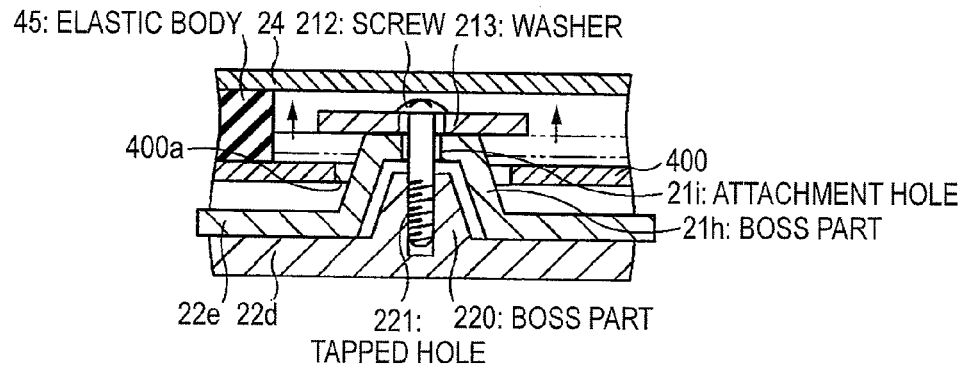
FIG. 7C is an exemplary sectional view taken on line 7C-7C in 7A.

FIGS. 7A to 7C show an exemplary attachment structure of the subboard 400; 7A is a plan view of the subboard 400 viewed from the back thereof; 7B is a sectional view taken on line 7B-7B in 7A; and 7C is a sectional view taken on line 7C-7C in 7A. A bottom plate is not shown in FIG. 7A.

The two positioning holes 400b are provided so as to be positioned in proximity of a peripheral area of the subboard 400 as shown in FIG. 7A and are formed so as to make a pitch between the two positioning holes 400b as long as possible in the subboard 400. The two attachment holes 400a are formed so as to make a pitch between the two attachment holes 400a shorter than the pitch of the two positioning holes 400b and are formed at positions so that a distance between the connector 40 and the attachment holes 400a is shorter than a distance between the connector 40 and the positioning holes 400b. The pitch of the attachment holes 400a may be almost equal to that of the positioning holes 400b. The number of the positioning holes 400b is not limited to two and may be three or more.

As shown in FIG. 7B, the positioning projection 22g is provided on the bottom wall 22d of the stand 22 through a rectangular portion 22h and projects to the back of the bottom wall 21e with the rectangular portion 22h fitted into the rectangular socket 21g provided in the bottom wall 21e of the casing 21. Accordingly, the subboard 400 can be positioned movably with respect to the stand 22.

As the attachment structure of the subboard 400 is configured in the way that the subboard 400 on which the connector 40 is mounted can move back and forth and from side to side and that the connector 40 on the cradle 20 corresponds to the connector 18 on the computer 10 according to the attaching operation of the computer 10 to the cradle 20. That is, the movable distance of the subboard 400 (for example, 0.6 mm back and forth and 0.6 mm from side to side) is made larger than the backlash or looseness amount between the outer peripheral of the computer 10 and the inner face of the side walls 22a, the front walls 22b, and the back wall 22c configuring the guide part of the stand 22 (for example, 0.3 mm back and forth and 0.3 mm from side to side).

To enable the subboard 400 to move back and forth and from side to side, for example, the inner diameter of the positioning hole 400b is set to 3 mm and the outer diameter of the positioning projection 22g is set to 1.8 mm. The backlash or looseness amount between the inner diameter of the attachment hole 400a and the outer diameter of the boss part 21h is set to 0.6 mm or more back and forth and 0.6 mm or more from side to side.

The attachment hole 400a provided in the subboard 400 and the boss part 21h provided in the casing 21 make up a horizontal support section for supporting the subboard 400 movably in the in-plane direction (horizontal direction) of the side where the connector 40 is attached. The attachment holes 400a are provided close to the connector 40, thereby suppressing deflection of the subboard 400 because of an external force given through the connector 40. The positioning hole 400b and the positioning projection 22g are provided in the peripheral area of the subboard 400 distant from the connector 40 and configure a horizontal movement regulation section for regulating the movement of the subboard 400 in the in-plane direction.

The boss part 21h, the elastic body 45, a screw 212, and a washer 213 make up a vertical support section for supporting the subboard 400 movably in a direction perpendicular to the in-plane direction. In FIG. 7A, the two horizontal movement regulation sections are placed distant from each other in the long side direction of the subboard 400 and are provided distant from the connector 40 so that a distance between the horizontal movement regulation sections is larger than a distance between the two horizontal support sections provided on both sides of the connector 40. Accordingly, a move in a rotation direction with the connector 40 as the center is regulated while a move of the connector 40 in the in-plane direction is allowed.

The elastic body 45 gives an upward elastic force to the subboard 400 as an elastic force giving section and when the connector 40 is pushed because of displacement between the connectors 18 and 40, the elastic body 45 is compressed and the subboard 400 moves in an arrow direction shown in FIG. 7C. The elastic body 45 may give an elastic force in the horizontal direction and the vertical direction of the subboard 400 without giving a frictional force.

(Attachment Work of Subboard)

To attach the subboard 400 to the bottom wall 21e of the casing 21, the positioning projection 22g is entered into the positioning hole 400b of the subboard 400 and the screw 212 is screwed into a tapped hole 221 of a boss part 220 provided on the bottom wall 22d of the stand 22 through the washer 213. Next, a bottom plate 24 is fixed to the tapped holes 211a of the stud 211 by screws (not shown).

When the bottom plate 24 is attached, the subboard 400 is pressed against the bottom wall 21e by the elastic body 45.

(Hook)

Figure 8A:
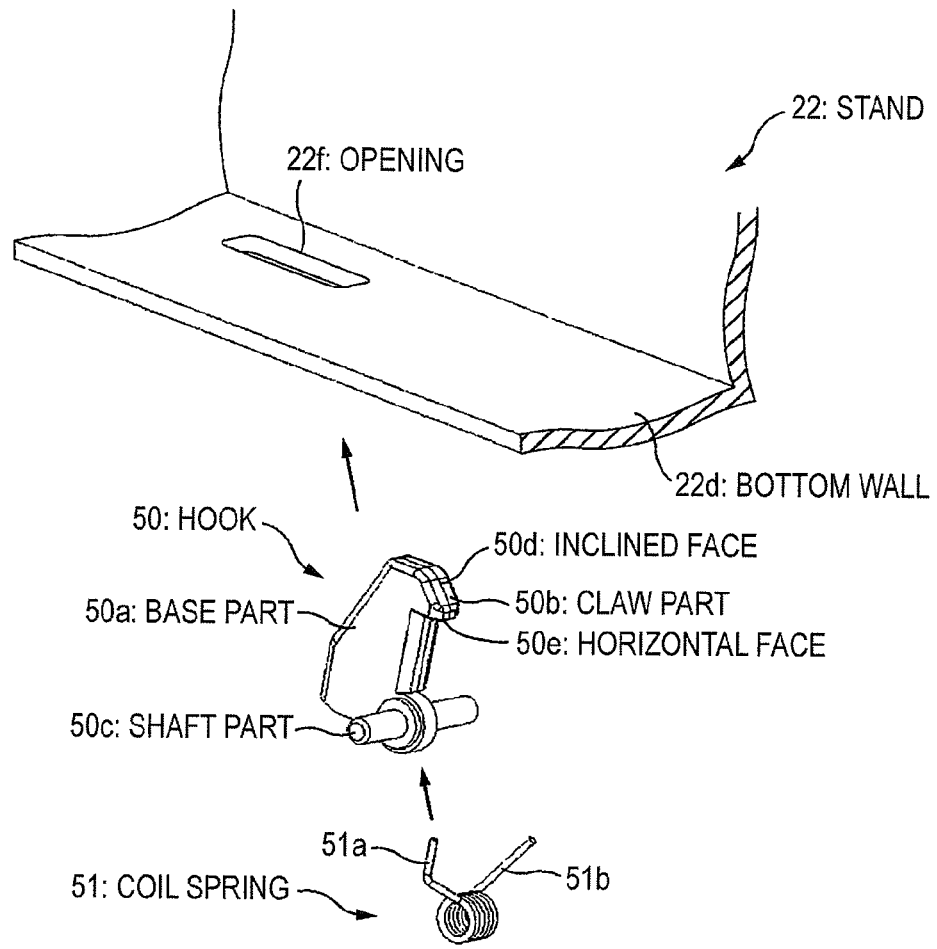
FIG. 8A is an exemplary exploded perspective view of the hook.
Figure 8B:
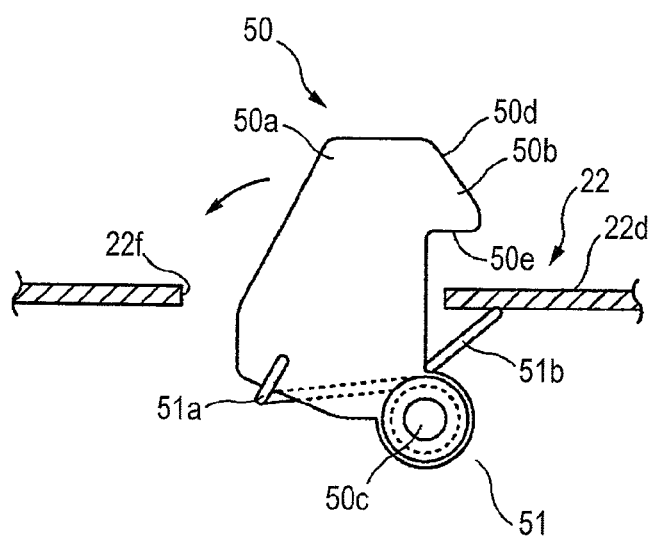
FIG. 8B is an exemplary sectional view of the hook to show an assembly state thereof.

FIGS. 8A to 8B show a structure example of the hook; 8A is an exploded perspective view of the hook and 8B is a sectional view of the hook to show an assembly state thereof. The hook 50 is configured of a base part 50a, a claw part 50b provided above the base part 50a, and a shaft part 50c provided below the base part 50a, and is configured as a one-piece molding using a material of a resin, etc. The claw part 50b has an inclined face 50d and a horizontal face 50e.

The shaft part 50c is journaled by a bearing (not shown) provided on the lower face side of the bottom wall 22d of the stand 22, a coil spring 51 is attached to the shaft part 50c of the hook 50, one L-shaped end part 51a of the coil spring 51 is retained in the base part 50a of the hook 50, and a linear end part 51b of the coil spring 51 is abutted against the lower face of the bottom wall 22d of the stand 22 for assembly.

Accordingly, the coil spring 51 gives an elastic rotation force to the hook 50 in an opposite direction against the arrow direction shown in FIG. 8B. A rotation force similar to that of the coil spring 51 may be given to the hook 50 by a tension spring or a compression spring.

(System Configuration of Portable Computer)

Figure 9:
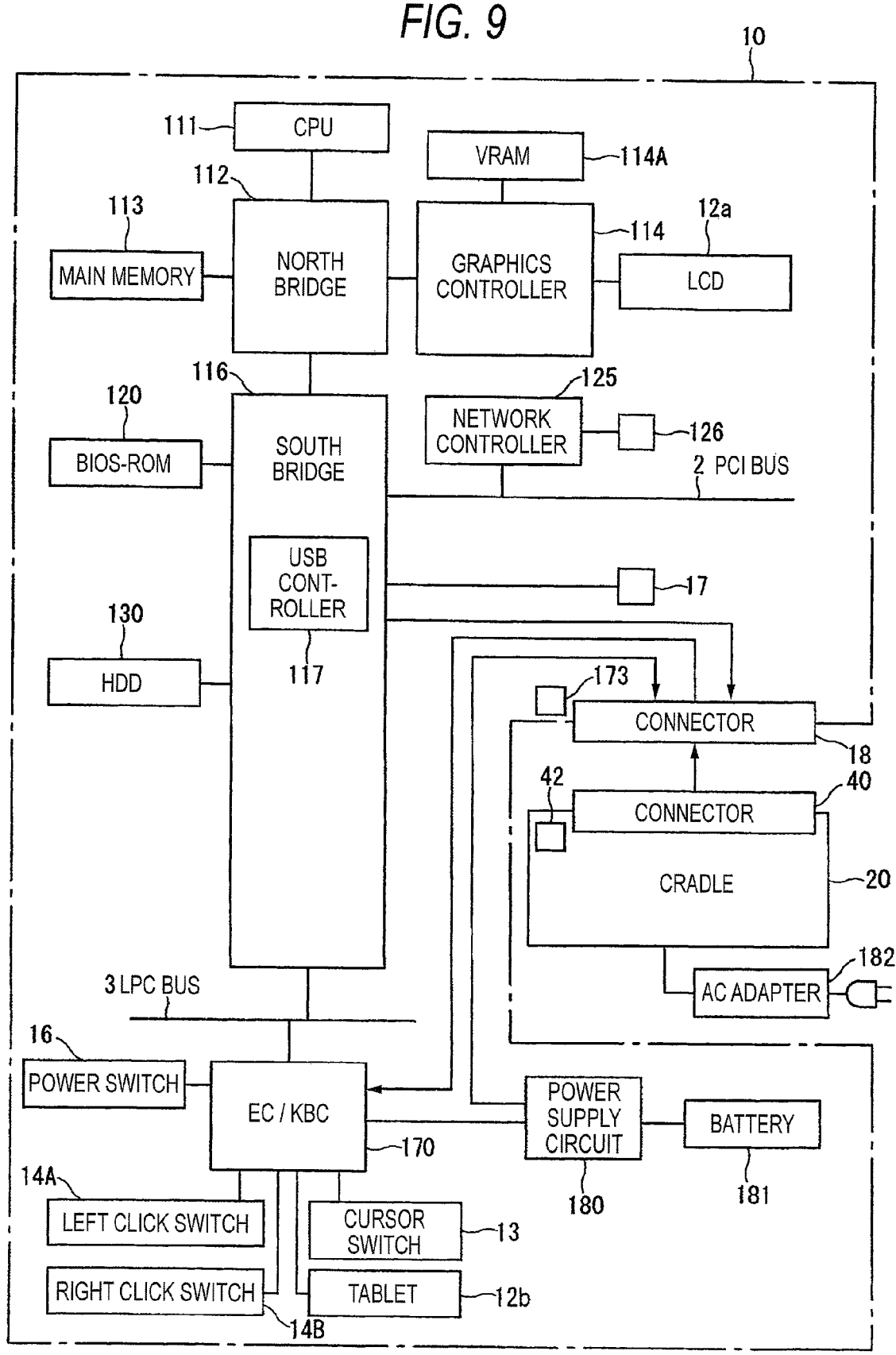
FIG. 9 is an exemplary block diagram to show the system configuration of a portable computer.

FIG. 9 is an exemplary block diagram to show the system configuration of the portable computer 10. The computer 10 includes a CPU 111, a north bridge 112, main memory 113, a graphics controller 114, an LCD 12a, a tablet 12b, a south bridge 116, BIOS-ROM 120, a network controller 125, a hard disk drive (HDD) 130, a connector 18, an embedded controller/keyboard controller IC (EC/KBC) 170, a power supply circuit 180, and the like.

The CPU 111 is a processor provided for controlling the operation of the computer 10. It executes an operating system and various application programs loaded into the main memory 113 from the HDD 130. The CPU 111 also executes a system Basic Input Output System (BIOS) stored in the BIOS-ROM 120. The system BIOS is a program for hardware control.

The north bridge 112 is a bridge device for connecting a local bus of the CPU 111 and the south bridge 116. The north bridge 112 also has a function of executing communications with the graphics controller 114 through an Accelerated Graphics Port (AGP) bus, etc. Further, the north bridge 112 also contains a memory controller for controlling access to the main memory 113.

The graphics controller 114 is a display controller for controlling the LCD 12a used as a display monitor of the computer 10. The graphics controller 114 displays data written into video memory (VRAM) 114A by the operating system or the application program on the LCD 12a.

The south bridge 116 contains an Integrated Drive Electronics (IDE) controller for controlling the HDD 130 and a USB controller 117 for controlling the USB terminal 17. The south bridge 116 is connected to a Peripheral Component Interconnect (PCI) bus 2 and a Low Pin Count (LPC) bus 3.

The network controller 125 is connected to the PCI bus 2. It executes communications with an external network machine through a LAN cable connected to a LAN port 126.

The EC/KBC 170 is a one-chip microcomputer into which an embedded controller (EC) for power management and a keyboard controller (KBC) for controlling the tablet 12b, the cursor key 13, the left click switch 14A, the right click switch 14B, etc., are integrated. The EC/KBC 170 has a function of turning on/off the power of the computer 10 in cooperation with the power supply circuit 180 in response to user operation of the power switch 16 as it operates.

The power supply circuit 180 generates system power to be supplied to the components of the computer 10 using external power supplied through an AC adapter 182 or a chargeable battery 181.

The computer 10 is connected to the cradle 20 by the connector 18 as described above. Each of the connectors 18 and 40 are provided with about 50 pins, for example. Some of the pins are defined as power supply pins for supplying operation power from the cradle 20 to the computer 10 and some are defined as signal pins connected to the USB signal lines.

(Attaching Operation)

Figure 10A:
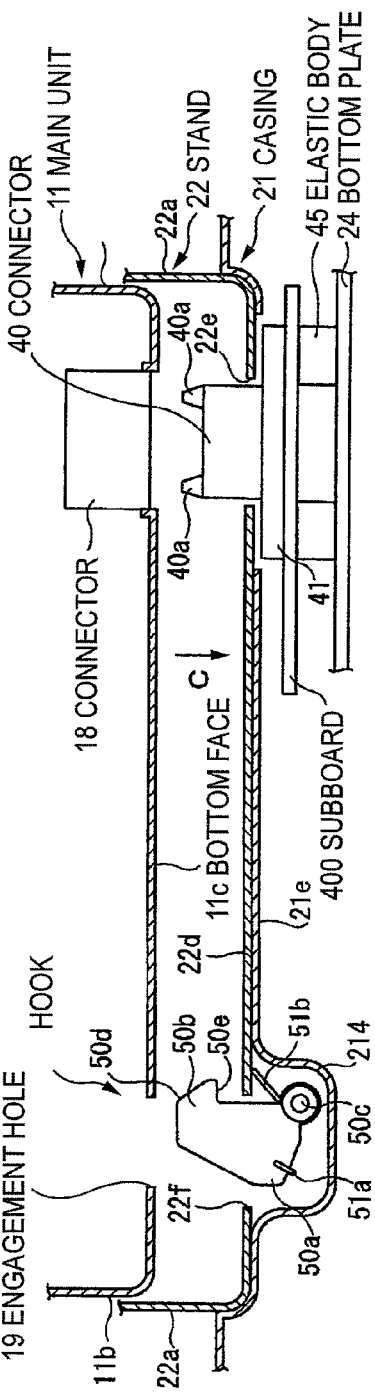
FIGS. 10A to 10C show an exemplary attaching operation of the portable computer on the cradle.
Figure 10B:
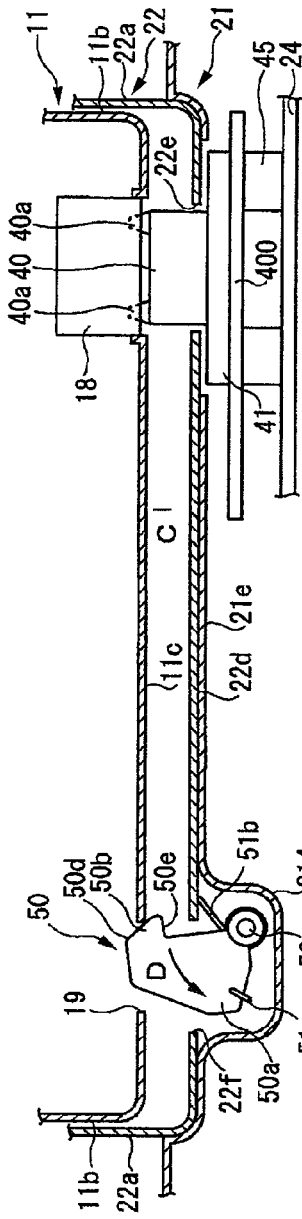
Figure 10C:
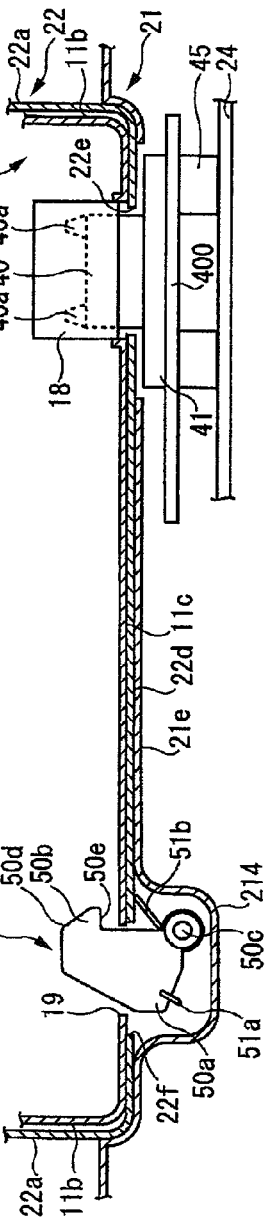

FIGS. 10A to 10C show an exemplary attaching operation of the computer 10 on the cradle 20. The computer 10 is pushed down in the arrow C direction along the back wall 22d of the stand 22. Before the computer is attached, the hook 50 is urged by the coil spring 51 and is in an upright state as shown in FIG. 10A. When the computer 10 is pushed down in the arrow C direction, the rim of the engagement hole 19 abuts the inclined face 50d of the hook 50 and causes the hook 50 to generate a reaction force to rotate in the arrow direction D in the figure. According to this reaction force, the hook 50 rotates in the arrow direction D in the figure against the spring force of the coil spring 51.

At this time, while the connector 40 on the cradle 20 and the connector 18 on the computer 10 are in the range in which guide parts 40*a* of the connector 40 can guide, even if the connectors 40 and 18 are placed out of the connection position, the subboard 400 moves in the board in-plane direction (horizontal direction) with it sunk downward against the elastic force of the elastic body 45, and the connectors 40 and 18 correspond to each other in the connection position.

If the computer 10 is further pushed down, the connector 40 is fitted into the connector 18 on the computer 10 and the hook 50 is restored to the former state by the spring force of the coil spring 51 and engages with the engagement hole 19.

(Detaching Operation)

FIGS. 11A to 11C show an exemplary detaching operation of the computer 10 from the cradle 20. To remove the computer 10 from the cradle 20, if the computer 10 is lifted up horizontally or the hook 50 side is lifted up, the rim of the engagement hole 19 abuts the horizontal face 50*e* of the claw part 50*b* of the hook 50 and the hook 50 cannot be rotated and thus it becomes difficult to remove the computer 10. Then, if the connector 18 side is lifted up in the F direction as shown in FIG. 11B while the computer 10 is lifted up in the upward direction E as shown in FIG. 11A, the hook 50 rotates in the arrow direction D in the figure and is detached from the engagement hole 19 and the computer 10 can be removed from the cradle 20.

ADVANTAGES OF THE EMBODIMENT OF THE INVENTION

According to the embodiment, since the connector 40 can be moved not only horizontally, but also vertically, the connectors 18 and 40 can avoid receiving an immoderate force and being damaged in connecting the connectors 18 and 40. Since the hook 50 is provided on the opposite to the connector 40, the posture of the computer 10 in removing from the cradle 20 is limited and the load on the connectors 18 and 40 can be lightened.

It is to be understood that the invention is not limited to the above-described specific embodiment thereof and various modifications may be made without departing from the spirit and the scope of the invention.

What is claimed is:

1. A support device comprising:
    an electronic device guide that guides an electronic device that is to be mounted thereon;
    a connector that connects to the electronic device mounted on the electronic device guide;
    a circuit board being attached with the connector;
    a horizontal support portion that supports the circuit board to be movable in an in-plane direction of a plane of the circuit board to which the connector is attached;
    a horizontal movement regulation portion that is provided at a peripheral edge of the circuit board and at a position apart from the connector for regulating a movement of the circuit board in the in-plane direction;
    a vertical support portion that supports the circuit board to be movable in a direction perpendicular to the in-plane direction to expose the connector from an opening that is formed at a position displaced from a center of a bottom wall of the electronic device guide toward one side; and
    an engagement piece having a claw that is provided at a position displaced from the center of the bottom wall of the electronic device guide toward the other side of the connector,
    wherein, when the electronic device is mounted on the electronic device guide, the claw engages with an engagement hole formed on a bottom wall of the electronic device, and
    wherein, when the electronic device is dismounted from the electronic device guide, the claw is disengaged from the engagement hole by pulling the electronic device upward while inclining the electronic device toward the position displaced toward the other side of the connector so as to allow the electronic device to be disengaged primarily from the connector.

2. The support device of claim 1, wherein the horizontal movement regulation portion comprises at least two horizontal movement regulation portions each having a hole formed on the circuit board and a projection housed in the hole for regulating the movement of the circuit board in the in-plane direction, and
    wherein the horizontal movement regulation portions are provided to have a distance larger than a support span of the circuit board by the vertical support portion.

3. The support device of claim 1, wherein the vertical support portion comprises an elasticity adding member that adds an elasticity to the circuit board.

4. The support device of claim 1, wherein the connector comprises a guide part for guiding toward a connection position.

5. An electronic device system comprising:
    an electronic device; and
    a support device comprising:
    an electronic device guide that guides an electronic device that is to be mounted thereon;
    a connector that connects to the electronic device mounted on the electronic device guide;
    a circuit board being attached with the connector;
    a horizontal support portion that supports the circuit board to be movable in an in-plane direction of a plane of the circuit board to which the connector is attached;
    a horizontal movement regulation portion that is provided at a peripheral edge of the circuit board and at a position apart from the connector for regulating a movement of the circuit board in the in-plane direction;
    a vertical support portion that supports the circuit board to be movable in a direction perpendicular to the in-plane direction to expose the connector from an opening that is formed at a position displaced from a center of a bottom wall of the electronic device guide toward one side; and
    an engagement piece having a claw that is provided at a position displaced from the center of the bottom wall of the electronic device guide toward the other side of the connector,
    wherein, when the electronic device is mounted on the electronic device guide, the claw engages with an engagement hole formed on a bottom wall of the electronic device, and
    wherein, when the electronic device is dismounted from the electronic device guide, the claw is disengaged from the engagement hole by pulling the electronic device upward while inclining the electronic device toward the position displaced toward the other side of the connector so as to allow the electronic device to be disengaged primarily from the connector.

* * * * *